(12) United States Patent
Rocke et al.

(10) Patent No.: US 7,393,604 B2
(45) Date of Patent: Jul. 1, 2008

(54) HYBRID POWER SYSTEM AND METHOD

(75) Inventors: Michael J Rocke, Pleasanton, CA (US); Don J Nguyen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 684 days.

(21) Appl. No.: 10/662,307

(22) Filed: Sep. 15, 2003

(65) Prior Publication Data
US 2005/0058857 A1 Mar. 17, 2005

(51) Int. Cl.
H01M 8/04 (2006.01)
H01M 8/12 (2006.01)
H01M 8/00 (2006.01)

(52) U.S. Cl. .............................. 429/22; 429/12; 429/23

(58) Field of Classification Search ........................ None
See application file for complete search history.

(56) References Cited

U.S. PATENT DOCUMENTS

| 6,369,461 | B1 | 4/2002 | Jungreis et al. |
| 6,406,806 | B1 * | 6/2002 | Keskula et al. ................ 429/13 |
| 6,519,510 | B1 | 2/2003 | Margiott et al. |
| 6,649,298 | B2 * | 11/2003 | Hayashi et al. ............... 429/34 |
| 6,787,259 | B2 * | 9/2004 | Colborn et al. ............... 429/23 |
| 6,855,443 | B2 * | 2/2005 | Gore ........................... 429/19 |
| 6,910,138 | B2 | 6/2005 | Hayashi et al. |
| 2002/0024332 | A1 | 2/2002 | Gardner |

* cited by examiner

*Primary Examiner*—Patrick Ryan
*Assistant Examiner*—Julian Mercado
(74) *Attorney, Agent, or Firm*—Dana B. Lemoine; Lemoine Patent Services, PLLC

(57) ABSTRACT

A hybrid power system includes a fuel cell and a secondary power source.

9 Claims, 8 Drawing Sheets

HYBRID POWER SYSTEM AND METHOD

FIELD

The present invention relates generally to power systems, and more specifically to power systems that include fuel cells.

BACKGROUND

Fuel cells represent a promising technology for powering mobile systems. Some fuel cells, such as those that consume chemicals to produce electrical energy, take a finite amount of time to start.

DESCRIPTION OF EMBODIMENTS

Figure 1:
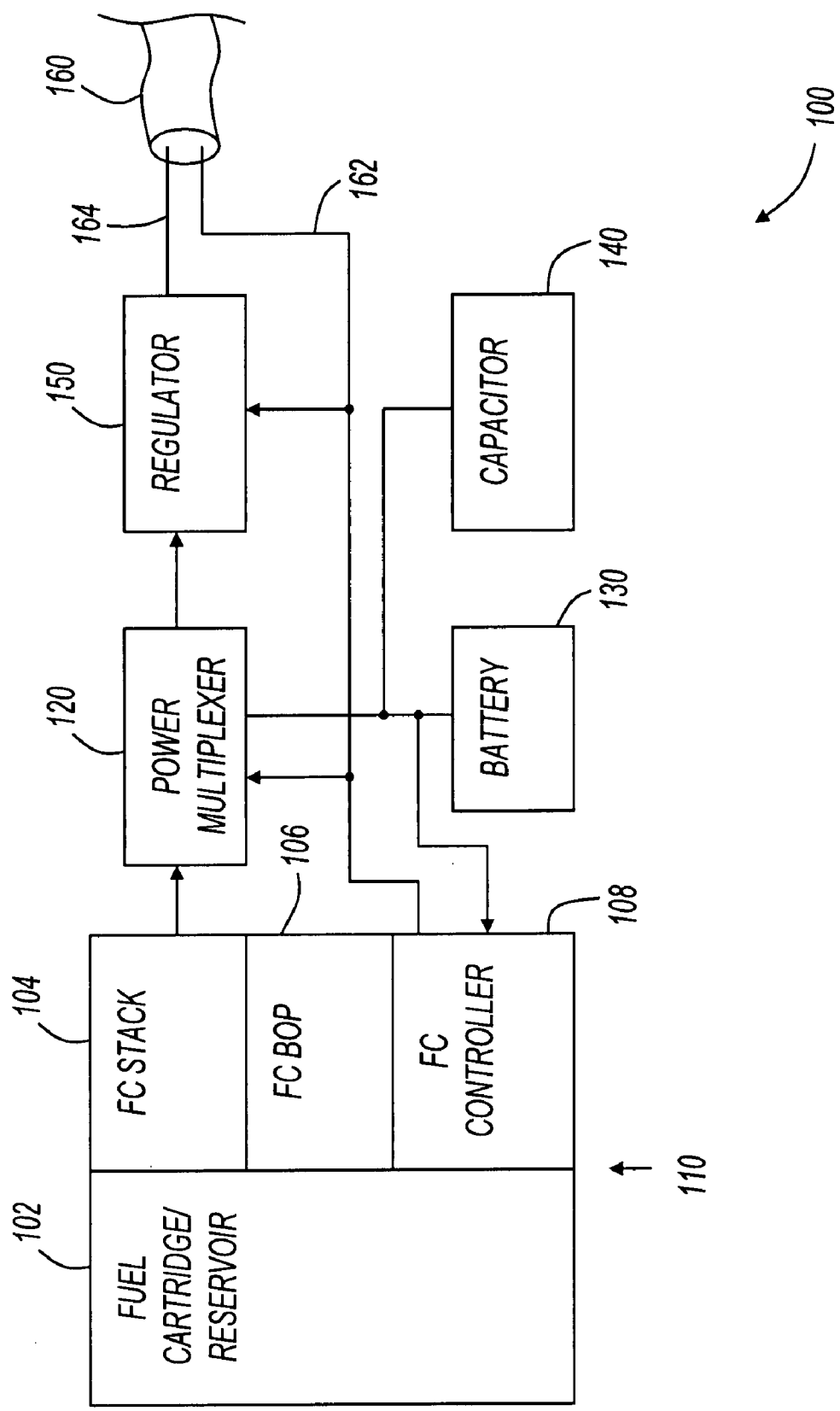
FIGS. 1 and 2 show diagrams of hybrid power systems.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows a diagram of a hybrid power system. Hybrid power system 100 includes fuel cell 110, battery 130, capacitor 140, power multiplexer 120, regulator 150, and interface cable 160. System 100 is referred to as a "hybrid" power system in part because the system includes a primary power source and a secondary power source. In embodiments represented by FIG. 1, fuel cell 110 is a primary power source, and battery 130 and capacitor 140 are secondary power sources.

Fuel cell 110 includes fuel cartridge/reservoir 102, fuel cell (FC) stack 104, balance-of-plant (BOP) 106, and FC controller 108. Fuel cartridge/reservoir 102 may be used to store fuel such as methanol, and to store waste products such as water. Fuel cell (FC) stack 104 is used to convert chemical energy into electrical energy. For example, in some embodiments, fuel cell 110 is a direct methanol fuel cell or a reformed methanol fuel cell that converts energy from methanol into electrical energy. Balance-of-plant (BOP) 106 includes the remaining components of fuel cell 110 including air pumps, fluid pumps, heat exchangers, and the like. Fuel cell controller 108 is used to control the operation of fuel cell 110, as well as to control other aspects of hybrid power system 100.

Interface cable 160 provides an interconnection between hybrid power system 100 and a load device (not shown). In some embodiments, the load device is a computer, but this is not a limitation of the present invention. For example, interface cable 160 may couple hybrid power system 100 to a laptop computer or a notebook computer. In some embodiments, hybrid power system 100 may be external to the load device, and in other embodiments, hybrid power system 100 may be internal to the load device.

Battery 130 may be any type of battery. For example, in some embodiments, battery 130 may be a hybrid battery such as a Lithium-Ion battery or a Nickel-Metal-Hydride battery. In some embodiments, hybrid power system 100 does not include battery 130. In these embodiments, the secondary power source does not include a battery.

Capacitor 140 may be any type of capacitor. In some embodiments, capacitor 140 may be a "standard" capacitor that includes conductive plates or coils and a dry separator or insulator. In other embodiments, capacitor 140 may be a "supercapacitor." The term "supercapacitor," as used herein, refers to any high capacitance device that includes electrodes and an electrolyte. For example, in some embodiments, capacitor 140 includes electrodes made of materials such as high surface area activated carbons, metal oxide, or conducting polymers. In some of these embodiments, high surface area electrode materials store charge in a double layer formed near the electrode surface. Also for example, in some embodiments, capacitor 140 includes an aqueous or organic electrolyte.

Capacitor 140 may include multiple supercapacitors coupled in series or parallel. Capacitor 140 may also include voltage balancing circuitry to balance the voltage on supercapacitors coupled in series to prevent an overvoltage condition from occurring on any one supercapacitor.

Controller 108 provides control for various operations of hybrid power system 100. For example, controller 108 may control various devices in BOP 106, thereby controlling the power generation of fuel cell 110. Further, controller 108 may sense the voltage present on the secondary power source, as well as control power multiplexer 120 and regulator 150. In some embodiments, controller 108 provides power to the load from the appropriate source, and also charges the secondary power source when appropriate.

In some embodiments, controller 108 also communicates with a load device using signals on node 162. For example, when fuel cell 110 is starting, controller 108 may start a fuel delivery pump in BOP 106, and command power multiplexer 120 to provide power to the load from the secondary power source. Further, during startup of fuel cell 110, controller 108 may communicate with the load device using conductor 162, and controller 108 may request that the load device reduce a load presented on node 164.

Controller 108 may be implemented using any of many different mechanisms. For example, controller 108 may include a processor such as a microprocessor, a digital signal processor, a microcontroller, or the like. Controller 108 may also be implemented using devices other than a processor. For example, controller 108 may be implemented using a state machine, a dedicated sequential controller, or the like. In some embodiments, controller 108 may receive information from the load device as well as send information to the load device.

Regulator 150 provides power to the load through interface cable 160 on node 164, and controller 108 provides handshaking and other information to the load device through interface cable 160 on node 162. Although nodes 162 and 164 are each shown as single lines in FIG. 1, any number of physical lines may be present. For example, node 164 may include two conductors: one for power, and one for ground. Also for example, node 164 may include multiple conductors to provide power at more than one voltage. In some embodiments, node 162 may also include many physical conductors to form a parallel data interface with control signals. In other embodiments, node 162 may include a serial interface to allow for serial communications between controller 108 and the load device.

In some embodiments, hybrid power system 100 is packaged as a stand-alone unit capable of powering any type of load. In these embodiments, controller 108 may start fuel cell 110 and charge the secondary power source without communicating with the load device. In other embodiments, a variety of different load devices may include an interface compatible with node 162 of interface cable 160, and controller 108 may communicate with the load device.

Figure 2:
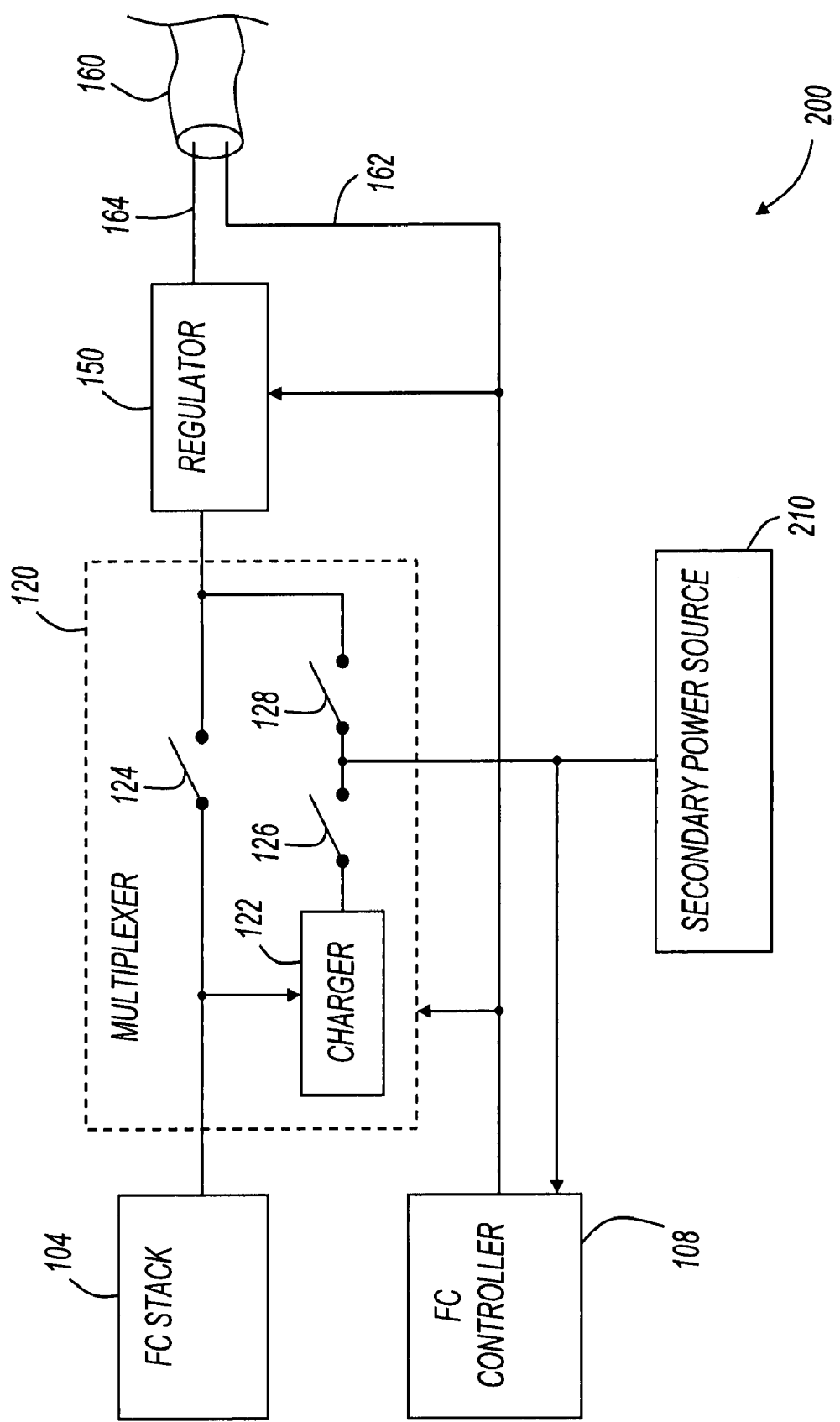

FIG. 2 shows a diagram of a hybrid power system. Hybrid power system 200 includes fuel cell stack 104, fuel cell controller 108, regulator 150, and interface cable 160. Hybrid power system 200 also includes secondary power source 210 and power multiplexer 120. Secondary power source 210 may include a battery such as battery 130 (FIG. 1), a capacitor such as capacitor 140 (FIG. 1), or any combination. In embodiments represented by FIG. 2, power multiplexer 120 includes charger 122 and switches 124, 126, and 128.

In operation, controller 108 may control charger 122 and switches 124, 126, and 128 within power multiplexer 120. For example, when fuel cell stack 104 is starting and secondary power source 210 is charged, controller 108 may open switches 124 and 126, and close switch 128. In this condition, secondary power source 210 may power the load. When fuel cell stack 104 is running and providing a sufficient quantity of power, controller 108 may close switch 124 and open switch 128. Depending on load conditions and the current output of fuel cell stack 104, controller 108 may close switch 126 and cause charger 122 to charge secondary power source 210.

Controller 108 may also communicate with a load device using node 162. For example, when fuel cell stack 104 is starting, and switch 128 is closed to provide power to the load from secondary power source 210, controller 108 may request the load device to reduce a load presented to hybrid power system 200 on node 164. In operation, if secondary power source 210 is charged and the load presented to hybrid power system 200 is nominal, controller 108 may not request that the load be reduced. Controller 108 may take many factors into account when determining whether to request a reduced load. These factors include, but are not limited to: the charged state or capacity of secondary power source 210, the rate at which fuel cell stack 104 starts or reacts to transients, the load presented to node 164, or the like.

Switches 124, 126, and 128 may be implemented using any suitable device. For example, in some embodiments, switches 124, 126, and 128 are implemented using isolated gate field effect transistors (IGFETs) or metal oxide semiconductor transistors (MOSFETs).

Figure 3:
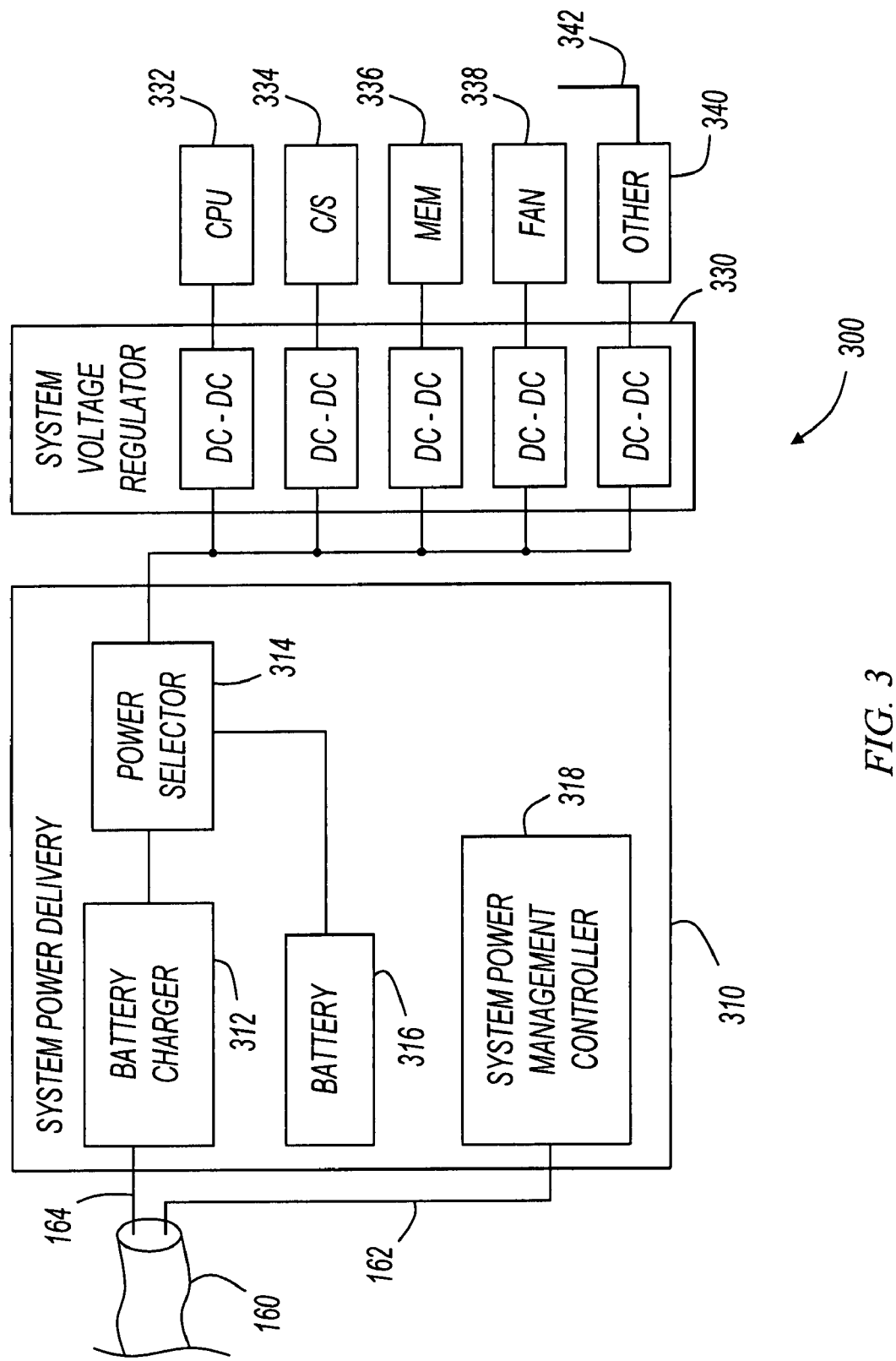
FIG. 3 shows a block diagram of a computer.

FIG. 3 shows a block diagram of a computer system. Computer system 300 includes system power delivery block 310, system voltage regulator 330, central processing unit (CPU) 332, chipset (C/S) 334, memory (MEM) 336, fan 338, and other devices 340. As shown in FIG. 3, system power delivery block 310 receives power from interface cable 160, and delivers power to system voltage regulator 330. System voltage regulator 330 converts the power as necessary, and provides power to various subsystems of the computer.

Computer system 300 may include any type of subsystem. For example, in some embodiments, other devices 340 may include a network interface such as a wireless network interface. In these embodiments, antenna 342 transmits and receives wireless signals. Antenna 342 may be a directional antenna or an omni-directional antenna. As used herein, the term omni-directional antenna refers to any antenna having a substantially uniform pattern in at least one plane. For example, in some embodiments, antenna 342 may be an omni-directional antenna such as a dipole antenna, or a quarter wave antenna. Also for example, in some embodiments, antenna 342 may be a directional antenna such as a parabolic dish antenna or a Yagi antenna.

System power delivery block 310 includes battery charger 312, power selector 314, battery 316, and system power management controller 318. In operation, battery charger 312 receives at least one DC voltage on node 164, and provides the DC voltage to power selector 314. Battery 316 also provides a DC voltage to power selector 314.

In some embodiments, system power management controller 318 communicates with a hybrid power system using node 162. For example, when computer system 300 is turned on, system power management controller 318 may alert a hybrid power system that the computer is turning on. Controller 318 may also control battery charger 312, power selector 314, and/or system voltage regulator 330 to present a load to the hybrid power system on node 164. In some embodiments, controller 318 may also have control over power states of integrated circuits, chipsets, or subsystems of computer system 300.

In operation, system power management controller 318 may receive a request from a hybrid power system to reduce a load present on node 164. In response to these requests, controller 318 may reduce the power consumption of integrated circuits, chipsets, or subsystems of computer system 300; or may otherwise reduce a load presented on node 164 by computer system 300.

System power management controller 318 may be implemented in any suitable manner. For example, in some embodiments, system power management controller 318 may be implemented in hardware as a state machine or a dedicated sequential controller. Also for example, in other embodiments, system power management controller 318 may be implemented in software as part of an operating system or power management software application. System power management controller 318 may also be implemented as a combination of hardware and software. The manner in which system power management controller 318 is implemented is not a limitation of the present invention.

In some embodiments, battery charger 312, battery 316, and power selector 314 are not included in computer system 300. For example, in some embodiments, hybrid power system 100 (FIG. 1) may be implemented within system power delivery block 310, and power from node 164 may be delivered directly to system voltage regulator 330.

Computer system 300 is shown with major components in a block diagram. Computer system 300 may include many more subsystems, components, and the like, without departing from the scope of the present invention. Further, computer system 300 represents any electronic system that includes a system power management controller, or that may benefit from being coupled to a hybrid power system.

Figure 4:
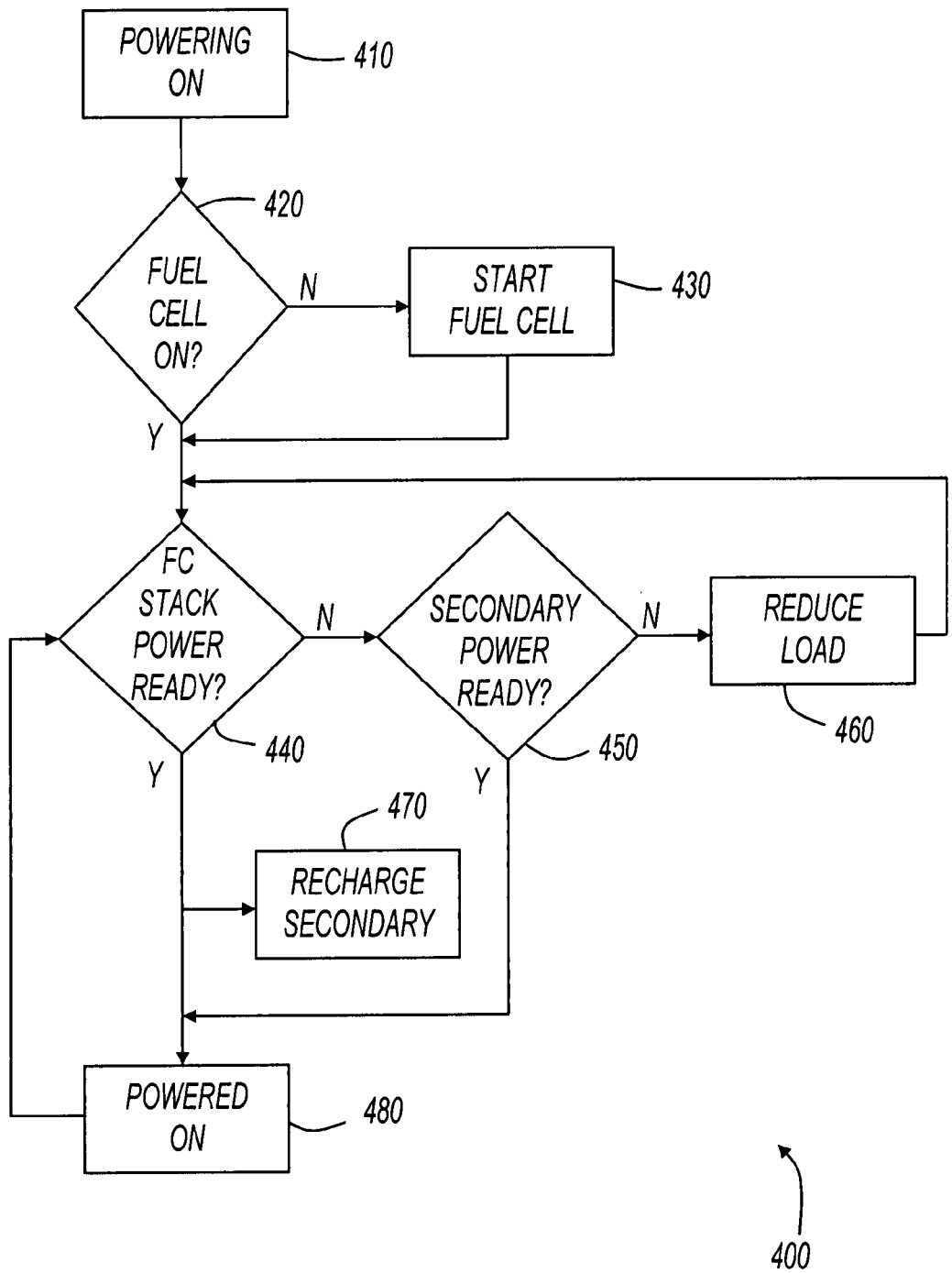
FIG. 4 shows a flowchart in accordance with various embodiments of the present invention.

FIG. 4 shows a flowchart in accordance with various embodiments of the present invention. In some embodiments, method 400 may be used to operate a hybrid power system. In other embodiments, method 400 may be used for communications between a hybrid power system and a load device. In some embodiments, method 400, or portions thereof, is performed by a fuel cell controller in a hybrid power system, a power management controller in a load device such as a computer, or any combination. Method 400 is not limited by the particular type of apparatus, software element, or person performing the method. The various actions in method 400 may be performed in the order presented, or may be performed in a different order. Further, in some embodiments, some actions listed in FIG. 4 are omitted from method 400.

Method 400 is shown beginning at block 410 in which a load device is powering on. In some embodiments, this may correspond to a controller receiving an indication that a computer such as a laptop or notebook is being turned on. At 420, a fuel cell system is checked to see if it is turned on. If not, the fuel cell system is started in block 430.

In some embodiments, blocks 420 and 430 may correspond to a fuel cell controller such as fuel cell controller 108 (FIG. 1) starting a fuel delivery pump to deliver fuel to a fuel cell stack. This may also correspond to a controller setting a power multiplexer such as power multiplexer 120 (FIGS. 1, 2) to provide power to a balance-of-plant from a secondary power source.

At 440, the fuel cell stack is checked to see if the output power is ready. In some embodiments, it may take a finite amount of time for the output power to be ready, in part because the fuel cell stack may take time to start. If the fuel cell stack power is not ready, then at 450, a secondary power source is checked to see if it is ready. The actions in 450 may correspond to checking a state of charge of a secondary power source. For example, referring back to FIG. 1, controller 108 may check the voltage level of battery 130 and capacitor 140 to determine if the secondary power source is ready.

If the secondary power source is not ready, then a request is made to reduce the load presented to the hybrid power system. In some embodiments, a request to reduce a load may also specify how much to reduce the load. For example, if the secondary power source is not fully charged, but can still source a significant amount of power while the fuel cell starts, a request may be made to partially reduce the load. If, at 450, the secondary power source is ready, then the system is powered on at 480 using power from the secondary power source.

If, at 440, the fuel cell stack power is ready, then the load is powered on at 480 using power from the fuel cell. As shown in FIG. 4, method 400 continually monitors the level of the fuel cell stack power and the secondary power, and if necessary, multiplexes power from either the fuel cell or the secondary power source to the load. Further, if at any time, the load is deemed to be too great for any reason, method 400 may request that the load be reduced. In addition, the secondary power source may be recharged at 470 if the load conditions and power output conditions permit.

Method 400 represents the intelligent operation of a hybrid power system such as hybrid power system 100 (FIG. 1). Steady-state power is supplied from a fuel cell when possible, and from a secondary power source when necessary. Further, method 400 may request that a load be reduced if the secondary power source becomes depleted. The secondary power source may be used to supply power to the load while the fuel cell starts, and the secondary power source may be recharged when conditions permit.

Figure 5:
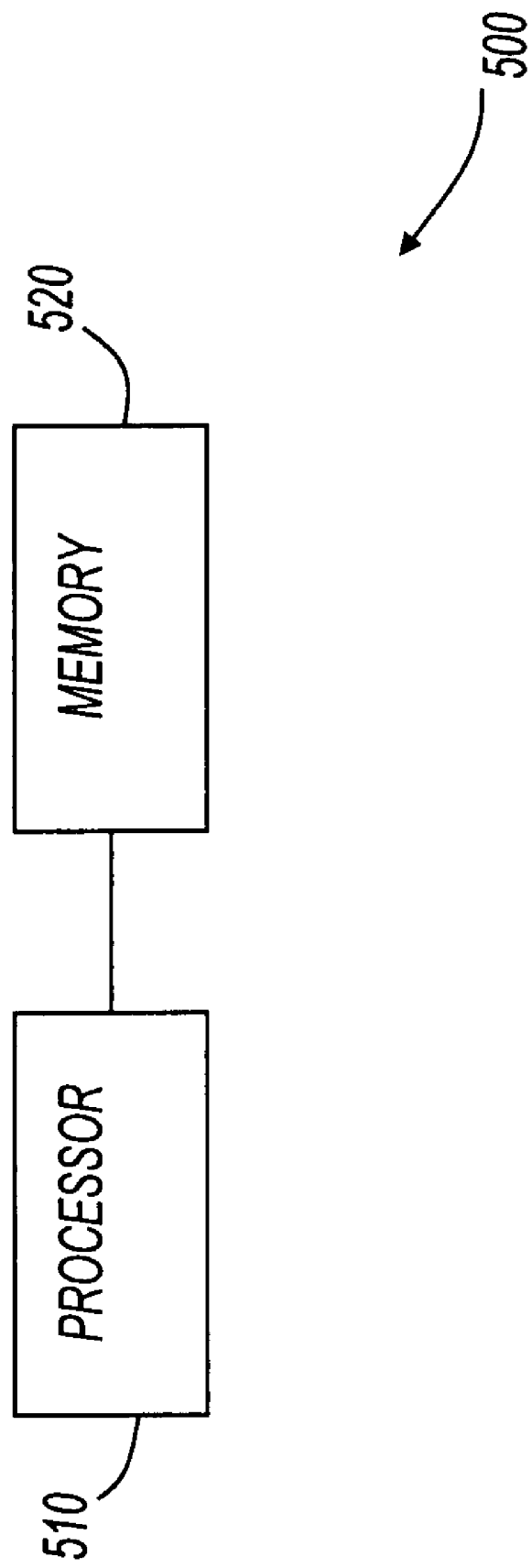
FIG. 5 shows an electronic system having a processor and memory.

FIG. 5 shows an electronic system having a processor and memory. FIG. 5 shows system 500 including processor 510, and memory 520. Processor 510 represents any type of processor, including but not limited to, a microprocessor, a microcontroller, a digital signal processor, a personal computer, a workstation, or the like. Processor 510 may be a processor that implements a fuel cell controller such as controller 108 (FIG. 1). For example, processor 510 may start a fuel cell, provide power to a load from a secondary power source, signal the load device to increase or decrease a load, charge a secondary power source from a primary power source, and the like.

Processor 510 may also be a processor that can run an operating system that implements a system power management controller such as that shown in FIG. 3. For example, processor 510 may receive information regarding a state of a hybrid power system, including a request to increase or decrease a load on the power system. Also for example, processor 510 may control charging of batteries or may control voltage regulators or power converters that supply power to various components of a computer system. Also for example, processor 510 may perform any of the method embodiments of the present invention.

Memory 520 represents an article that includes a machine readable medium. For example, memory 520 represents any one or more of the following: a hard disk, a floppy disk, random access memory (RAM), dynamic random access memory (DRAM), static random access memory (SRAM), read only memory (ROM), flash memory, CDROM, or any other type of article that includes a medium readable by processor 520. Memory 520 can store instructions for performing the execution of the various method embodiments of the present invention.

Although processor 510 and memory 520 are shown separately in FIG. 5, in some embodiments they are combined. For example, in some embodiments, processor 510 is a microcontroller with embedded memory such as flash memory. In these embodiments, the combination of processor 510 and memory 520 may form a controller such as fuel cell controller 108 (FIG. 1) or system power management controller 318 (FIG. 3).

Figure 6:
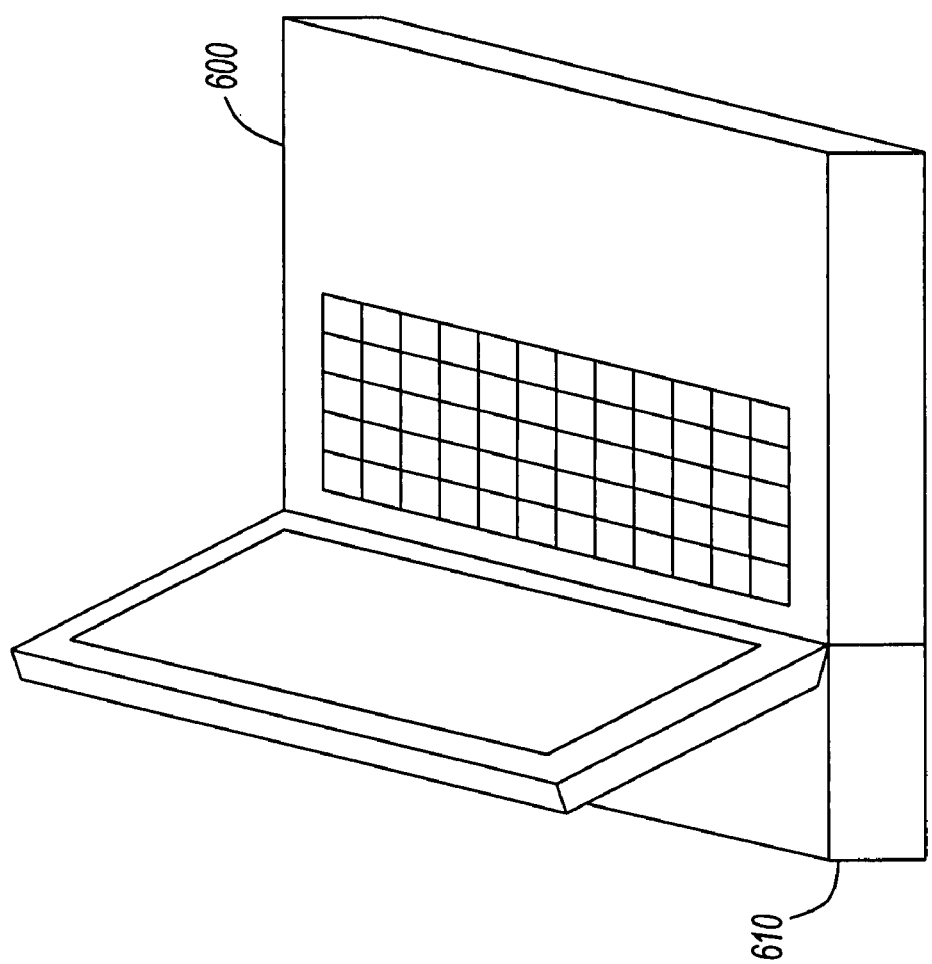
FIGS. 6-8 show system diagrams in accordance with various embodiments of the present invention.
Figure 7:
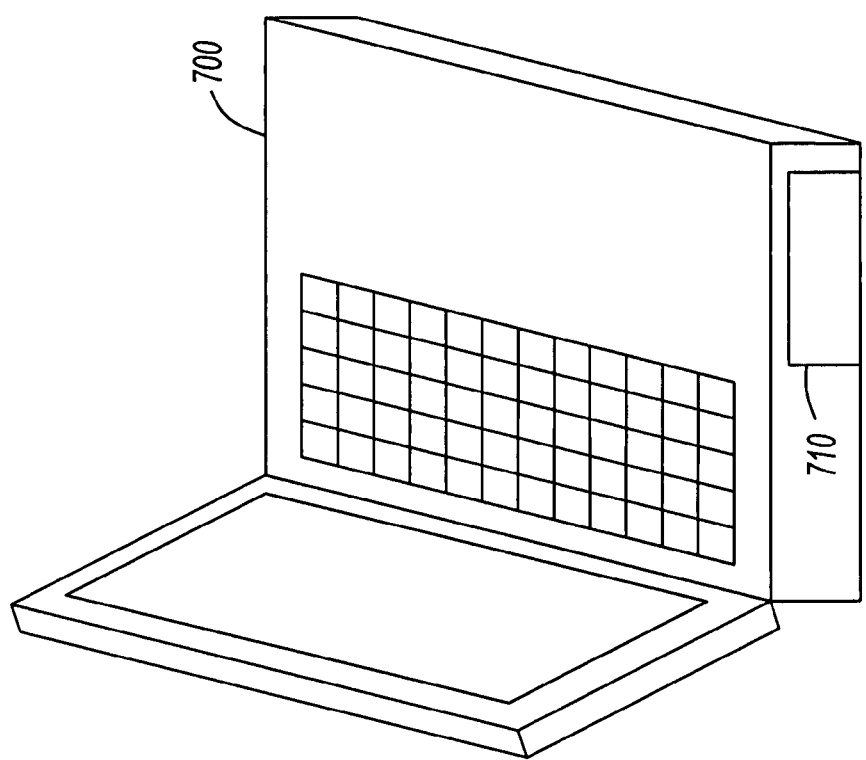
Figure 8:
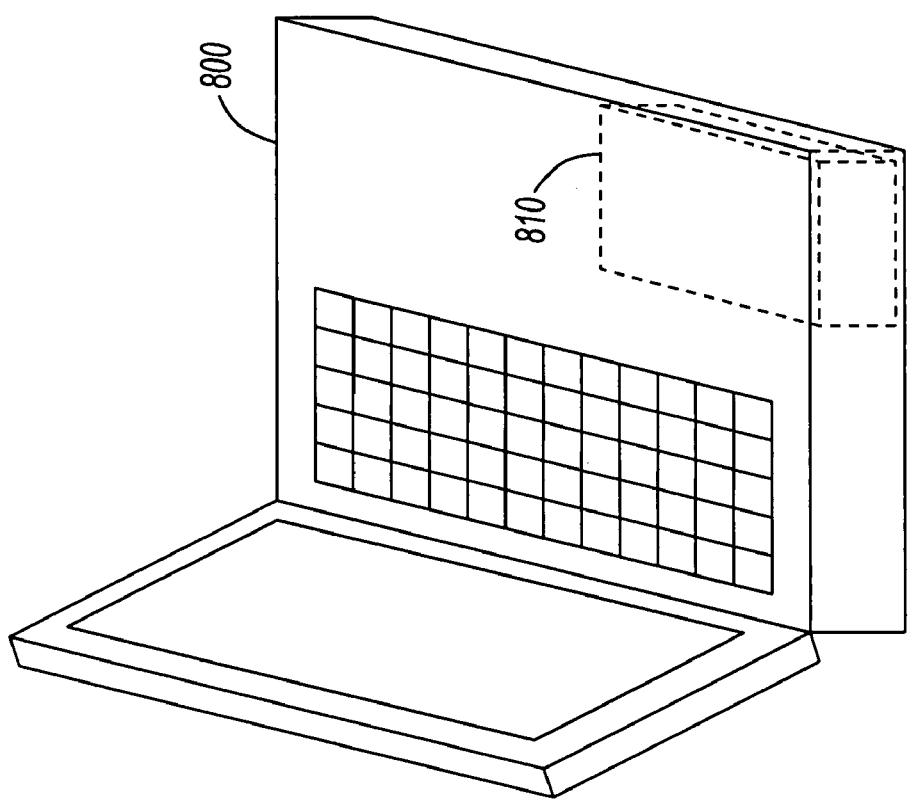

FIGS. 6-8 show electronic systems in accordance with various embodiments of the present invention. Each of FIGS. 6-8 may include systems such as hybrid power system 100 (FIG. 1), or computer system 300 (FIG. 3). FIG. 6 shows a computer having an external hybrid power system. External hybrid power system 610 may be a hybrid power system such as hybrid power system 100 (FIG. 1). In some embodiments, external hybrid power system 610 is coupled to computer 600 by multiple conductors. For example, conductors may be provided to receive power from hybrid power system 610 and also to provide a communications path between hybrid power system 610 and computer 600. Conductors may also be provided to allow communications between hybrid power system 610 and computer 600.

FIG. 7 shows a computer with a hybrid power system in a "swappable bay." As used herein, the term "swappable bay" refers to a bay substantially within the form factor of computer 700. The swappable bay may or may not accept devices other than hybrid power system 710. For example, the swappable bay may accept devices such as a DVD drive, a battery, or the like.

Hybrid power system 710 may be a hybrid power system such as hybrid power system 100 (FIG. 1). In some embodiments, the swappable bay includes one or more connectors with multiple electrical conductors. For example, conductors may be provided to receive power from hybrid power system 710 and also to provide a communications path between hybrid power system 710 and computer 700.

FIG. 8 shows a computer with a semi-permanently affixed hybrid power system. As used herein, the term "semi-permanently affixed" refers to a device that is not designed to be readily removed by a consumer. Although hybrid power system 810 is semi-permanently affixed within computer 800, a fuel cartridge within, or coupled to, hybrid power system 810 may be readily removed by a consumer. For example, in embodiments that include a fuel cell powered by methanol, a disposable or refillable methanol canister may be readily removable. Hybrid power system 810 may be a hybrid power system such as hybrid power system 100 (FIG. 1).

Although the present invention has been described in conjunction with certain embodiments, it is to be understood that modifications and variations may be resorted to without departing from the spirit and scope of the invention as those skilled in the art readily understand. Such modifications and variations are considered to be within the scope of the invention and the appended claims.

What is claimed is:

1. A hybrid power system comprising:
   a fuel cell;
   a battery;
   a power delivery interface capable of being coupled to a portable computer;
   a power multiplexer coupled to provide power through the power delivery interface from only one of the fuel cell or the battery at a time;
   a controller operatively coupled to the fuel cell and battery to receive power readiness indications, operatively coupled to control the power multiplexer to select one of the fuel cell or the battery as a power source, and operatively coupled to the power delivery interface to signal the portable computer to reduce a load;
   wherein the hybrid power system is packaged separately from the portable computer, and only connects with the portable computer using the power delivery interface.

2. The hybrid power system of claim 1 wherein the power multiplexer includes circuitry to charge the battery with the fuel cell.

3. The hybrid power system of claim 1 wherein the power delivery interface comprises:
   at least one power conductor; and
   at least one signal conductor to signal a state of the controller.

4. The hybrid power system of claim 1 wherein the battery comprises a Lithium-Ion battery.

5. The hybrid power system of claim 1 wherein the battery comprises a Nickel-Metal-Hydride battery.

6. The hybrid power system of claim 1 further comprising a capacitor coupled in parallel with the battery.

7. A method of operating a hybrid power system that includes a fuel cell, a battery, and power delivery interface to provide power to a portable computer, the hybrid power system being separately packaged from the portable computer, the method comprising:
   checking if the fuel cell is on;
   starting the fuel cell;
   determining if the fuel cell is ready to source power;
   determining if the battery is ready to source power;
   if neither the fuel cell nor the battery is ready to source power, signaling the portable computer through the power delivery interface to reduce a load; and
   if the fuel cell is not ready to source power and the battery is ready to source power, setting a power multiplexer capable of providing power from one of the fuel cell or the battery at a time to provide power from the battery.

8. The method of claim 7 wherein setting a power multiplexer to provide power from the battery comprises providing power from a battery and capacitor combination.

9. The method of claim 7 further comprising signaling the portable computer to reduce a load if the fuel cell is not ready to source power and the battery becomes depleted.

* * * * *